United States Patent [19]
Jirnov et al.

[11] Patent Number: 5,713,210
[45] Date of Patent: Feb. 3, 1998

[54] SLIDING-BLADE REFRIGERATION APPARATUS AND METHOD

[76] Inventors: Olga Jirnov; Alexei Jirnov, both of 8951 Braesmont, Apt. 134, Houston, Tex. 77096

[21] Appl. No.: 641,511

[22] Filed: May 1, 1996

Related U.S. Application Data

[63] Continuation-in-part of Ser. No. 582,122, Jan. 2, 1996, which is a continuation-in-part of Ser. No. 400,764, Mar. 8, 1995, Pat. No. 5,511,525.

[51] Int. Cl.$^6$ .................................. F25B 9/00; F25D 9/00
[52] U.S. Cl. ..................... 62/87; 62/402; 62/238.2
[58] Field of Search .............................. 62/87, 92, 401, 62/402, 238.2

[56] References Cited

U.S. PATENT DOCUMENTS

| | | | |
|---|---|---|---|
| 3,913,351 | 10/1975 | Edwards | 62/87 X |
| 3,967,466 | 7/1976 | Edwards | 62/87 X |
| 4,027,993 | 6/1977 | Wolff | 60/649 X |
| 4,041,708 | 8/1977 | Wolff | 60/649 |
| 4,088,426 | 5/1978 | Edwards | 62/402 X |
| 4,187,692 | 2/1980 | Midolo | 62/402 |
| 4,187,694 | 2/1980 | Midolo | 62/402 |

FOREIGN PATENT DOCUMENTS

| | | | |
|---|---|---|---|
| 486192 | 1/1976 | U.S.S.R. | 62/402 |
| 779750 | 11/1980 | U.S.S.R. | 62/238.2 |
| 1262219 | 10/1986 | U.S.S.R. | 62/402 |
| 1495601 | 7/1989 | U.S.S.R. | 62/402 |

*Primary Examiner*—Christopher B. Kilner
*Attorney, Agent, or Firm*—Kenneth A. Roddy

[57] ABSTRACT

A sliding-blade refrigeration apparatus and method which utilizes ambient air mixed with water as the refrigerant medium. A mixture of fine droplets of cool water in ambient air is isothermally compressed in a sliding-blade air-water compressor. Compressed air is separated from the water and adiabatically expanded in a sliding-blade air-motor to perform useful work and produce refrigerated air. Separated water is evaporated in a boiler and during the vapor cycle performs useful work in a sliding-blade steam motor. The spent steam is condensed in a condenser and cool water from the condenser is injected back into the air-water compressor completing the cycle. The rotors of the air-motor and steam motor are connected with the rotor of the air-water compressor and cause simultaneous rotation of the air-water compressor rotor as they rotate. In another embodiment, the rotor of the air-water compressor is rotated by an external power source connected to the shaft of the rotor rather than by the working steam.

18 Claims, 9 Drawing Sheets

$$\text{———} \quad \beta = \frac{1 - \left(\frac{P_1}{P_2}\right)^{\frac{K-1}{K}}}{\frac{K-1}{K} \ln \frac{P_1}{P_2} + \left(\frac{P_1}{P_2}\right)^{\frac{K-1}{K}} - 1} \qquad \text{- - - -} \quad \beta = \frac{1}{\left(\frac{P_1}{P_2}\right)^{\frac{K-1}{K}} - 1}$$

SLIDING-BLADE REFRIGERATION APPARATUS AND METHOD

CROSS REFERENCE TO RELATED APPLICATION

This application is a continuation-in-part of U.S. patent application Ser. No. 08/582,122, filed Jan. 2, 1996, pending, which is a continuation in part of U.S. patent application Ser. No. 08/400,764, filed Mar. 8, 1995, now U.S. Pat. No. 5,511,525.

BACKGROUND OF THE INVENTION

1. Field of the Invention

This invention relates generally to refrigeration apparatus and methods, and more particularly to a sliding-blade refrigeration apparatus and method using an air-water mixture as the refrigerant medium.

2. Brief Description of the Prior Art

There are known different methods and devices employing two-component and two-phase working mediums in power and refrigerating cycles in order to increase thermal efficiency wherein a mixture of fine droplets of a saturated liquid is compressed and expanded in a saturated vapor. For example, U.S. Pat. No. 5,027,602 to Glen et al discloses a heat engine apparatus having refrigeration and heat pump cycles approximating the Carnot cycle.

This method has the following limitations. If the mixture is used in the refrigerating cycle as a refrigerant, then in contrast to isothermal compression, isothermal expansion in the apparatus is not thermodynamically advantageous. To increase the coefficient of performance of the refrigerating cycle it is necessary after compressing the mixture to separate the liquid phase-heat transfer medium, and expansion work for cooling purposes must be executed by only the vapor phase.

The present sliding-blade refrigeration apparatus and method using an air-water mixture as the refrigerant medium overcomes these shortcomings by producing a more effective refrigeration cycle wherein the air-water compressor operates on a two-phased working medium, and in the process, isothermally compressed air is then separated and adiabatically (not isothermally) expanded in the air-motor, executing useful work and in so doing, cools. The present air-water compressor is capable of operating with a large content of liquid phase and provides high coefficient of filling the operating chamber, with minimal hydrodynamic losses.

There sliding-vane pumps known in the art which are designed for performing a plurality of functions in which vane radial travel is accomplished by the interaction between vane tips with the internal body bore. Ruzic, U.S. Pat. No. 5,144,802 discloses such a rotary fluid apparatus having pairs of connected vanes.

The principle disadvantage of such apparatus is that their design does not allow inlet and outlet channels at the full width of operating chambers which lowers its filling coefficient and leads to elevated hydrodynamic losses and also causes vane intensive wear. Moreover, lubricant is present in the operating chamber which excludes it's application as an air-water compressor.

Hiroshi et al, U.S. Pat. No. 5,044,910 discloses a vane pump with rotatable drive means for vanes wherein the vane tips are prevented from contacting the internal body bore. However, in this type of pump, the vane movement control means are positioned in the operating chambers and are not protected from interaction with the working medium. Moreover, the short vanes extend maximally in rotor slots and are subjected to large bending loads that subject the slot area to distortion and results in increased resistance as they slide in the slots.

Vane-type rotary pumps are also known in the art wherein the vanes are prevented from contacting the internal bore of the body. Chu, U.S. Pat. No. 5,385,458 discloses a vane-type rotary compressor. Eckharolt, U.S. Pat. No. 5,316,456 discloses a slide vane machine. Clerc, U.S. Pat. No. 2,562,698 discloses a rotary compressor having short vanes resting on rollers. Because of the large bending moment, such short vanes do not give full value positive effect.

One of the main disadvantages of the aforementioned apparatus is their intolerance of small amounts of liquids, because the critical surfaces of the structures requiring lubrication are not isolated from the working medium. For example, vane tips sliding over the fixed wall, vane movement control means and the like.

An oscillating vane engine known as the KROV (Keller Rotor Oscillating Vane) which operates on geothermal fluids of all qualities is described in a book written by A. L. Austin titled "Prospect For Advances In Energy Conversion Technologies For Geothermal Energy Development", 1975, also a book written by H. Christopher and H. Armstead titled "Geothermal Energy", 2nd ed., pp. 200-210, 1983.

Although the Keller Rotor Oscillating Vane engine (KROV) should be capable of handling a wide range of fluid conditions over high expansion ratios, it is mechanically very complex and its efficiency is unlikely to be high. Also, the sealing between inlet and exhaust, which is dependent upon contact between the roller-pistons and vanes, is likely to be unsound.

Cryogenic refrigeration systems using a gas are also known in the art. Harper, U.S. Pat. No. 5,388,428 discloses a gas expansion refrigeration system. Kiczek et al, U.S. Pat. No. 5,267,449, discloses a method and system for cryogenic refrigeration using air.

A disadvantage of these types of systems is that it necessitates previously compressed air or gas being at ambient temperature that requires extraneous means for compressing and cooling the air or gas to the ambient temperature.

The present invention overcomes these problems and limitations of the prior art by using only ambient air mixed with water as the refrigerant medium. A mixture of fine droplets of cool water in ambient air is isothermally pressed together thereby minimizing adiabatic heating of the air, but further the water is detached from the air and the compressed air is utilized in a sliding-blade air-motor which enables the air to expand and perform useful work in extracting heat and results in attaining a cryogenic temperature. Heating water is further utilized during the vapor cycle for performing useful work and also to drive the air-water compressor rotor. The air-water mixture with a larger amount of cool water in the mixture (sufficient for isothermal compression of the air) is cmpressed during refrigeration cycles through a sliding-blade air-water compressor as described in detail hereinafter.

SUMMARY OF THE INVENTION

It is therefore an object of the present invention to provide a method and sliding-blade refrigeration apparatus using an air-water mixture as the refrigerant medium which is small and light and can generate a large amount of chill.

It is another object of this invention to provide a method and sliding-blade refrigeration apparatus using an air-water mixture as the refrigerant medium which will substantially reduce environmentally damaging emissions.

Another object of this invention is to provide a method and sliding-blade refrigeration apparatus using an air-water mixture as the refrigerant medium which has improved thermal efficiency.

A further object of this invention is to provide a method and sliding-blade refrigeration apparatus using an air-water mixture as the refrigerant medium which may employ a variety of types of thermal sources, including solar or waste heat products.

A still further object of this invention is to provide a method and sliding-blade refrigeration apparatus using an air-water mixture as the refrigerant medium which is inexpensive to manufacture in mass production and is inexpensive to operate, service, and repair.

Other objects of the invention will become apparent from time to time throughout the specification and claims as hereinafter related.

The above noted objects and other objects of the invention are accomplished by a sliding-blade refrigeration apparatus having sliding-blade air-water compressor, sliding-blade steam and air motors, a vortex separator, a vortex boiler, and a condenser. The compressor and motors have oval-shaped operating chambers with cylindrical rotors rotatably mounted eccentrically therein. Each rotor has at least two rectangular blades slidably mounted in slots extending through the cylindrical rotor in mutually perpendicular relation and each blade is independently movable relative to the other in a radial direction. Each blade has a guide element extending from opposed sides and through the opposed end walls of the respective rotor which are slidably received in guide grooves in the respective chamber end walls. The rotors are connected together by shafts in concentric relation whereby rotation of the steam and air motor rotors causes simultaneous rotation of the air-water compressor rotor and the guide elements traveling in the cylindrical-shaped guide grooves cause the blades to extend and retract radially with their outer ends following the inner periphery of the respective chamber side wall with a constant minimum clearance. The movement control members of the sliding-blades are lubricated and reliably isolated from the working medium.

In operation, rotation of the air-water compressor rotor draws ambient air into the air-water compressor operating chamber, compresses it where the fine dispersed water is simultaneously injected at a quantity sufficient for isothermal compression of the air. This air-water mixture is compressed and discharged into the vortex separator where the water is separated, passes to the vortex boiler, evaporized using a heat source and then enters the steam motor operating chamber to turn the air-water compressor rotor. The waste steam-water mixture is discharged from the steam motor and condensed by a condenser, where the water is cooled down and injected into the air-water compressor and mixed again with the air. Compressed air without water is drained off and enters the air-motor to expand and to perform useful work for driving the air-water compressor rotor and also for extracting heat and results in attaining a cryogenic temperature. The air-water compressor rotor may be turned by extraneous means without a steam motor. In this case the separated water enters the radiator where it is cooled and then injected into the air-water compressor operating chamber and mixed again with the air.

DESCRIPTION OF THE PREFERRED EMBODIMENT

Figure 1:
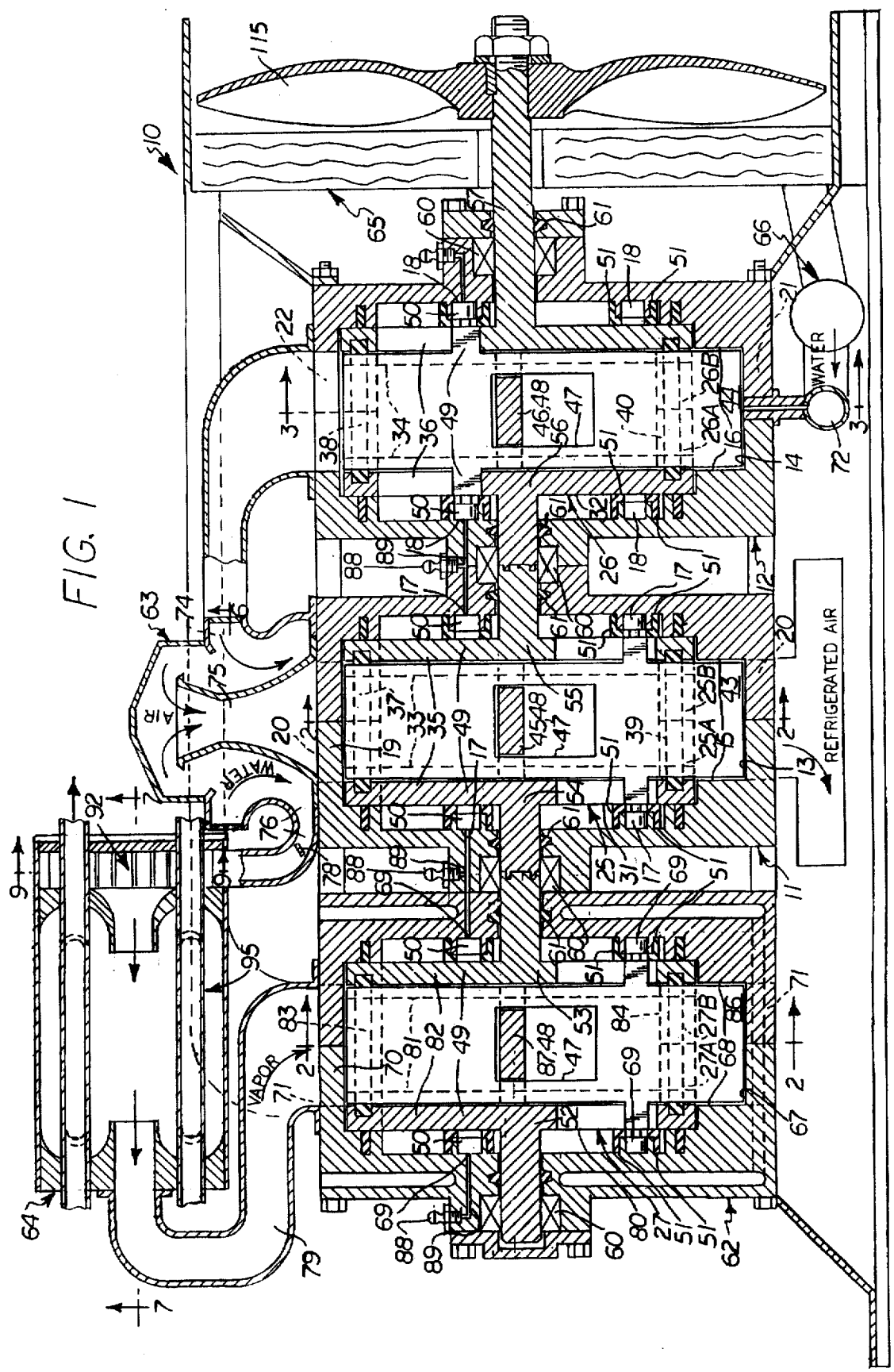
FIG. 1 is a vertical cross section of the sliding-blade refrigeration apparatus using air-water mixture as the refrigerant medium in accordance with the present invention.
Figure 2:
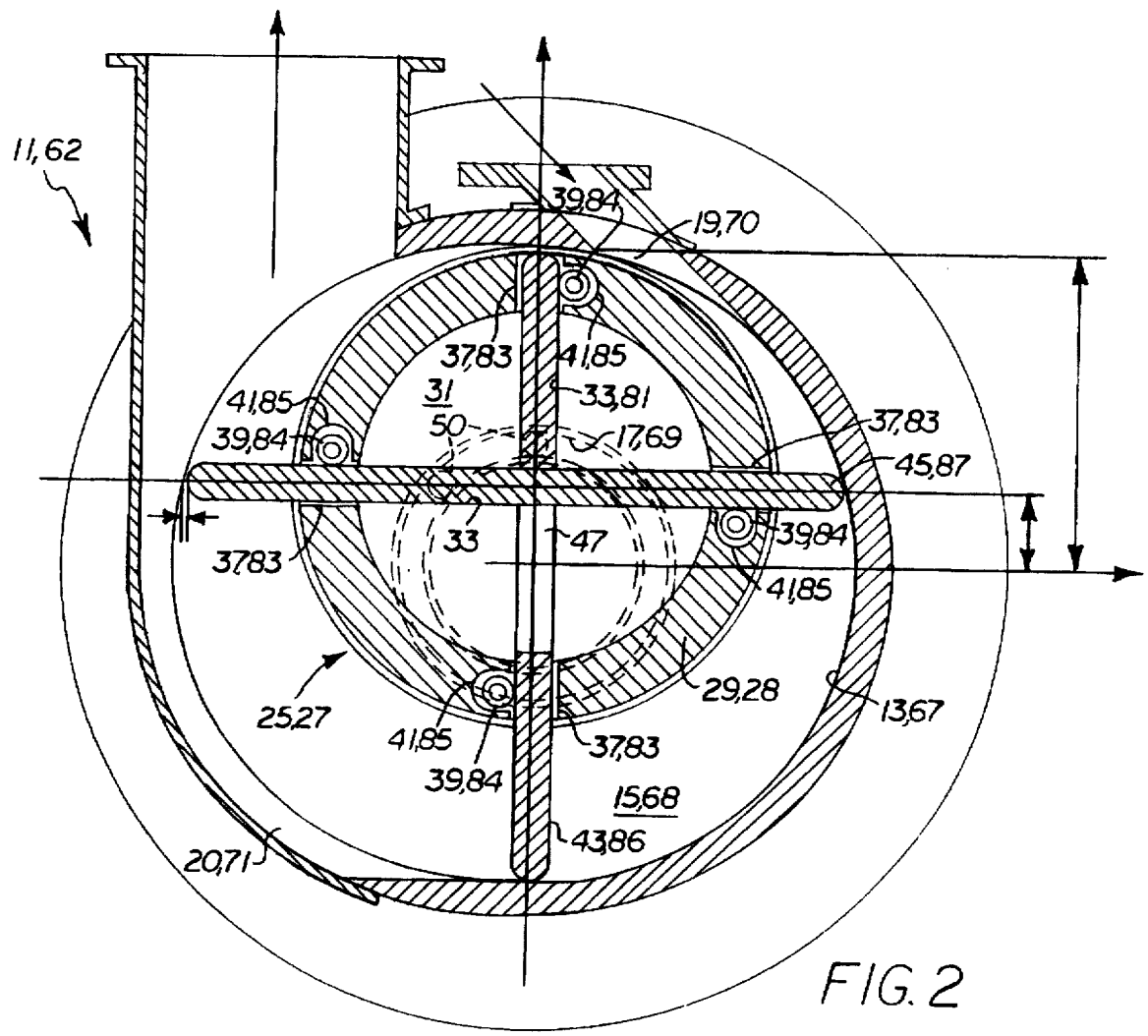
FIG. 2 is a vertical cross section through the air and steam motor chambers of the sliding-blade refrigeration apparatus taken along lines 2—2 of FIG. 1 and FIG. 11.
Figure 3:
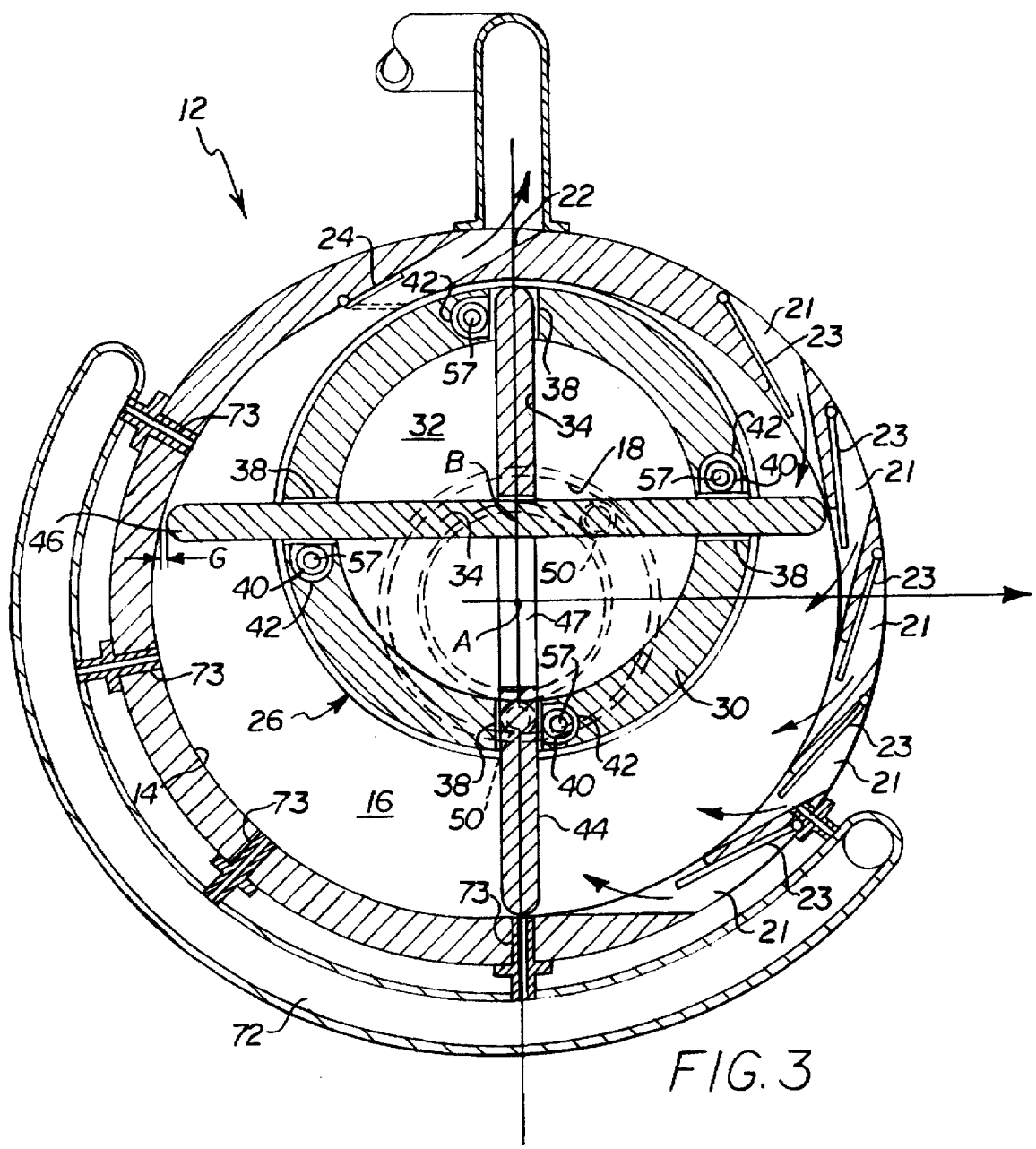
FIG. 3 is a vertical cross section through the air-water compressor chamber of the sliding-blade refrigeration apparatus taken along line 3—3 of FIG. 1 and FIG. 11.

Referring to the drawings by numerals of reference, there is shown in FIG. 1, a preferred sliding-blade refrigeration apparatus using air-water mixture as the refrigerant medium in accordance with the present invention is shown in vertical cross section in FIGS. 1, 2 and 3. The refrigeration system 10 has an oval shaped sliding-blade air-motor operation chamber 11, an adjacent sliding-blade air-water compressor operating chamber 12, sliding-blade steam motor operating chamber 62, a vortex separator 63, a vortex boiler 64, a condenser 65, and pump 66.

The air-motor operating chamber 11 and steam motor operating chamber 62 (FIG. 2), and the air-water compressor operating chamber 12 (FIG. 3) are each defined by oval shaped cavities having contoured oval-shaped side walls 13, 67, and 14 and opposed facing flat end walls 15, 68, and 16 respectively.

Continuous cylindrical-shaped guide grooves 17, 69, and 18 are formed in the opposed interior surfaces of the flat end walls 15, 68, and 16 of the air motor operating chamber 11, steam motor operating chamber 62, and air-water compressor operating chamber 12, respectively. The interior and exterior peripheral surfaces of the guide grooves 17, 69, and 18 are raised above the flat surface, The center "A" of each cylindrical-shaped guide groove 17, 69, and 18 is concentric with the center of the respective oval-shaped air motor chamber 11, steam motor chamber 62, and air-water compressor chamber 12.

As best seen in FIG. 2, the air and steam motor chambers 11 and 62 each have an inlet port 19 and 70, respectively, through their side walls 13 and 67 positioned at an angle to allow entry of the working medium into the chamber tangential to the plane of rotation and a relatively large outlet port 20 and 71 which extends circumferentially along approximately one-half of their respective side walls to allow the working medium to exit tangential to the plane of rotation. The width of the inlet ports 19, 70 and outlet ports 20, 71 are approximately the same width as the air and steam motor chambers 11 and 62, respectively, to provide maximum filling of the volume of the chambers and minimize hydrodynamic loss.

As best seen in FIG. 3 the air-water compressor chamber 12 has a series of air intake ports 21 circumferentially spaced along approximately one-half of its side wall 14 each positioned at an angle to allow entry of air into the chamber tangential to the plane of rotation and an angular exhaust port 22 through its side wall which allows the air-water mixture to exit tangential to the plane of rotation. The width of the air intake ports 21 and exhaust port 22 are approximately the same width as the air-water compressor chamber 12 to provide maximum filling of the volume of the chamber and minimize hydrodynamic loss.

Each of the air intake ports 21 is provided with a one-way valve 23 which allows air to flow only into the compressor chamber 12, and the exhaust port 22 is provided with a one-way valve 24 which allows the air-water mixture to flow only out of the compressor chamber. An arcuate hollow water channel 72 is spaced a distance from the outside of the side wall 14 of the air-water compressor chamber 12. A series of circumferentially spaced water atomizers 73 extend radially between the water channel and the side wall 14 and join the interior of the water channel 72 with the interior cavity of the air-water compressor operating chamber 12 in fluid communication.

Figure 6:
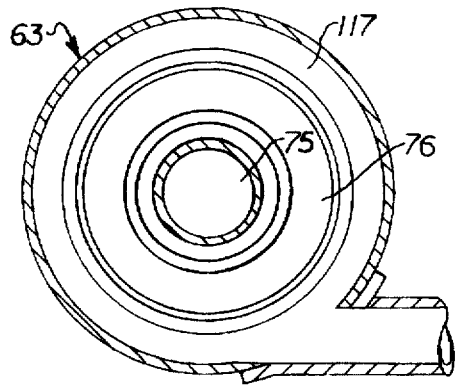
FIG. 6 is a horizontal cross section through the vortex separator of the sliding-blade refrigeration apparatus taken along line 6—6 of FIG. 1 and FIG. 11.

As best seen in FIGS. 1 and 6, the air-water compressor exhaust port 22 is connected with the tangential inlet port 74 of the vortex separator 63 which allows a high pressure air-water mixture through inlet port 74 to enter tangential to the annular peripheral channel 117 of the separator 63. In this peripheral channel 117, the air and water are divided or stratified by centrifugal force. Water enters the annular channel 76 and air enters the central air channel 75 that is connected with inlet port 19 of the air motor chamber 11.

Figure 9:
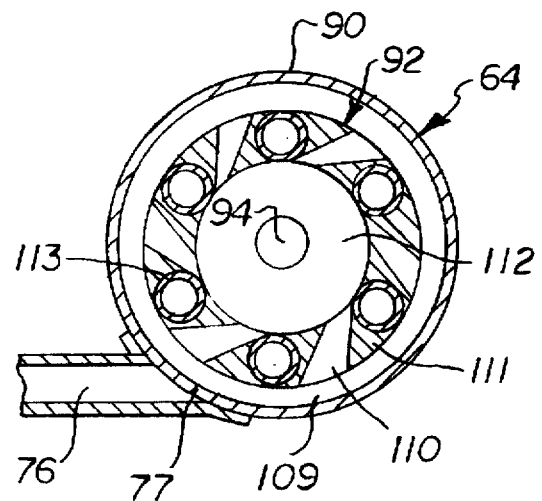
FIG. 9 is a vertical cross section through the vortex boiler of the sliding-blade refrigeration apparatus taken along line 9—9 of FIG. 1.

As best seen in FIGS. 1, 6, and 9, the water channel 76 of separator 63 is connected with the inlet port 77 of the boiler 64. The water channel 76 has a throttle 78. As best seen in FIG. 1, the outlet channel 79 of the boiler 64 is connected with inlet port 70 of the steam motor chamber 62, and the outlet port 71 of the steam motor chamber 62 is connected with the condenser 65. Water from the condenser 65 is delivered by the pump 66 into the water channel 72 and injected through the water atomizers 73 into the air-water compressor operating chamber 12, completing the cycle.

An air motor rotor 25, a steam motor rotor 27 and an air-water compressor rotor 26 are rotatably disposed in the respective air and steam motor operating chambers 11, 62 and air-water compressor operating chamber 12.

Figure 4:
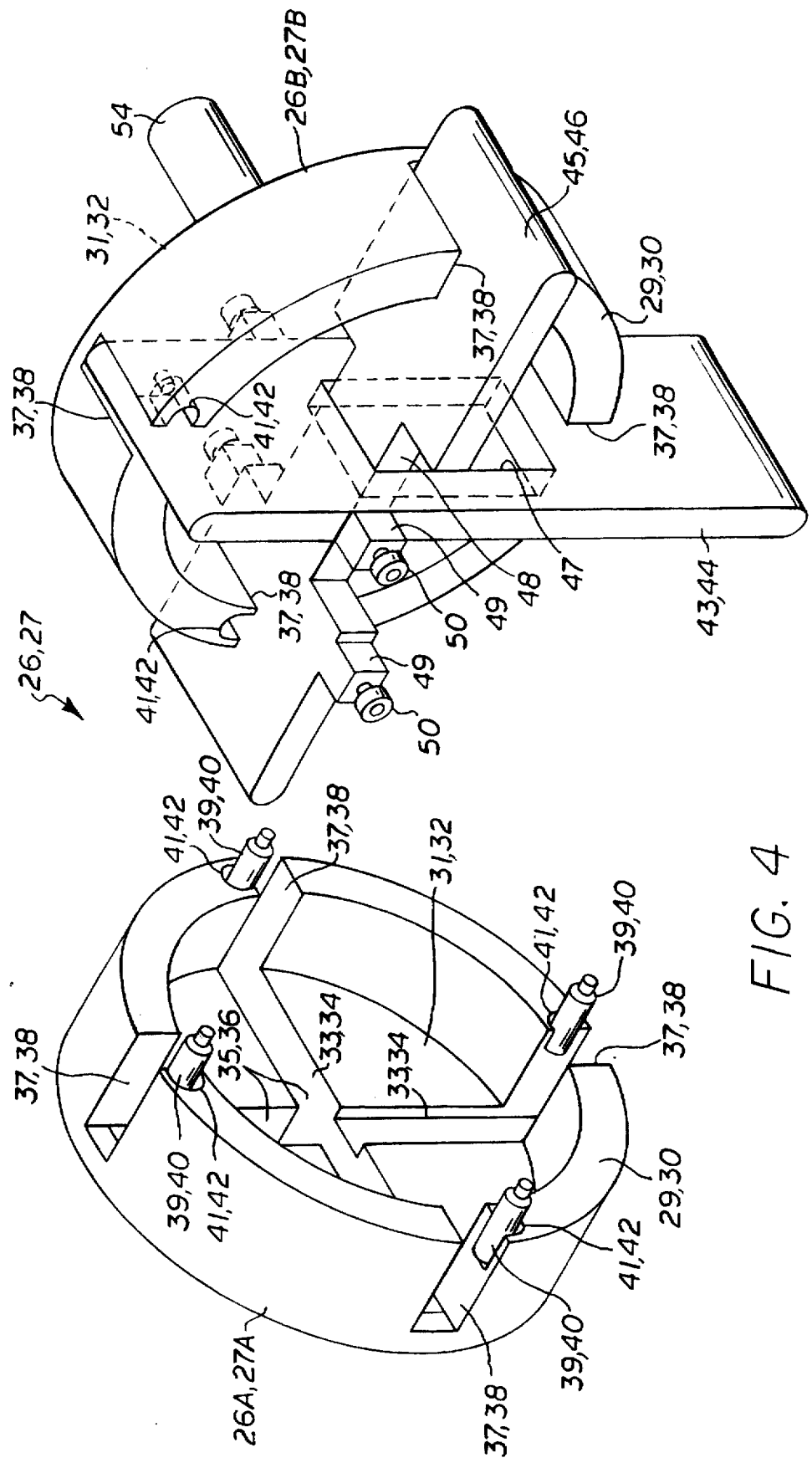
FIG. 4 is an exploded isometric view of the air-water compressor and air and steam motor rotors of the sliding-blade refrigeration apparatus shown in an unassembled condition.
Figure 5:
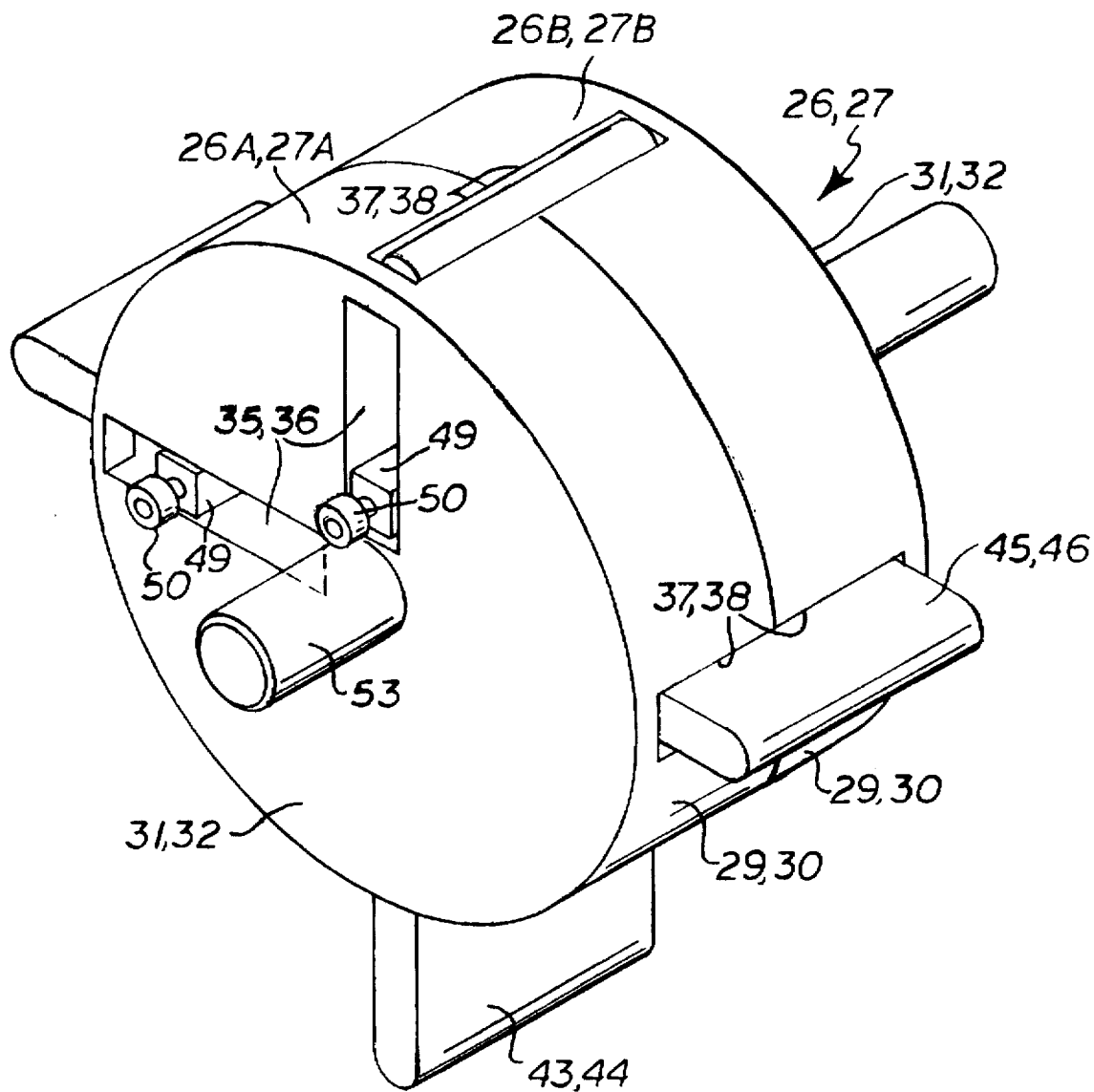
FIG. 5 is an isometric view of the air-water compressor and air and steam motor rotors of the sliding-blade refrigeration apparatus shown in an assembled condition.

As best seek in FIGS. 4 and 5, the air and steam motor rotors 25 and 27 and air-water compressor rotor 26 are each formed by a pair of opposed hollow cylindrical members 25A–25B and 27A–27B and 26A–26B, respectively, each having a circular side wall 29, 28 and 30 and an end wall 31, 80 and 32. A pair of perpendicular elongate rectangular slots 33, 81 and 34 are formed in the interior surface of the end walls 31, 80 and 32 of the cylindrical members 25A–25B and 27A–27B and 26A–26B and extend through the center of rotation of the cylindrical members. A portion of the slots 33, 81 and 34 on one side of the center of rotation extend all the way through the flat end walls 31, 80 and 32 of the cylindrical members 25A–25B and 27A–27B and 26A–26B to form a pair of rectangular perpendicular slots 35, 82 and 36 through the outer surface of the flat end walls 31, 80 and 32, as best seen in FIG. 5.

A series of circumferentially spaced rectangular slots 37, 83 and 38 extend through the circular side walls 29, 28 and 30 of the circular members 25A–25B and 27A–27B and 26A–26B from their open end and terminate at the flat end walls 31, 80 and 32 in axial alignment with the slots 33, 81 and 34 in the flat end walls.

Rollers 39, 84 and 40 are mounted in recesses 41, 85 and 42 in the side walls 29, 28 and 30 of the cylindrical members 25A–25B and 27A–27B and 26A–26B closely adjacent each slot 37, 83 and 38 with their curved exterior surface protruding a short distance into the slot opening (FIGS. 2, 3, and 4).

A pair of perpendicular elongate rectangular rigid blades 43, 45, 86, 87, 44 and 46 are slidably received in the elongate slots 33, 81 and 34, respectively. One blade 43, 86 and 44 of each pair is provided with a central rectangular opening 47 and the other blade 45, 87 and 46 of each pair is provided with a central narrow rectangular portion 48 which is received through the opening 47 such that the perpendicular blades 43, 86, 44, and 45, 87, 46, can slide independently relative to one another. A foot lug 49 extends outwardly a short distance from the opposed side edges of each blade 43, 86, 44, and 45, 87, 46 in opposed relation, and a roller 50 is rotatably mounted at the outer end of each lug.

As shown in FIG. 5, the circular members 25A, 25B and 27A, 27B and 26A, 26B are secured together in opposed relation over the blades 43, 86, 44 and 45, 87, 46 to form a circular drum configuration. The outer ends of the blades 43, 86, 44 and 45, 87, 46 extend slidably through the slots 37, 83 and 38 in the circular side walls 29, 28 and 30 and are supported on opposed sides by the rollers 39, 84, 40 as seen in FIGS. 2 and 3. In the assembled condition of rotors 25, 27, 26, as shown in FIG. 5, the lugs 49 and rollers 50 extend through the slots 35, 82 and 36 in the flat end walls 31, 80 and 32 and the rollers 50 are received and travel in the continuous guide grooves 17 and 69 in the opposed interior surfaces of the flat end walls 15 and 68 of the air and steam motor operating chambers 11, 62 and 18 in the opposed interior surface of the air-water compressor operating chamber 12, respectively, as seen in FIG. 1.

A lubricant is supplied to the rollers 39, 84, 40 and 50 through channels 89 and lubricators 88. An elastomeric seal collar 51 is installed on the raised interior and exterior peripheral surfaces of the guide grooves 17, 69 and 18 and forms a fluid sealing relation against the exterior surfaces of the end walls 31, 80 and 32 of the cylindrical members 25A–25B, 27A–27B and 26A–26B.

As best seen in FIG. 1, a shaft 52 secured to the exterior of the flat end wall 80 of one the steam motor rotor cylindrical members 27A extends outwardly from its center through a hole in the flat end wall 68 of the steam motor chamber 62 and a coaxial opposed shaft 53 secured to the exterior of the opposed flat end wall 80 of the opposed cylindrical member 27B extends outwardly from its center through a hole in the opposed flat end wall 68 of the steam motor chamber 62. A shaft 54 secured to the exterior of the flat end wall 31 of one the air motor rotor cylindrical members 25A extends outwardly from its center through a hole in the flat and wall 15 of the air motor chamber 11 and a coaxial opposed shaft 55 secured to the exterior of the opposed flat end wall 31 of the opposed cylindrical member 25B extends outwardly from its center through a hole in the opposed flat end wall 15 of the air-motor chamber 11. Similarly, a shaft 56 secured to the exterior of the flat end wall 32 of the air-water compressor rotor cylindrical members 26A extends outwardly from its center through a hole in the flat end wall 16 of the air-water compressor chamber 12 and a coaxial opposed shaft 57 secured to the exterior of the opposed flat end wall 32 of the opposed cylindrical member 26B extends outwardly from its center through a hole in the opposed flat end wall 16 of the air-water compressor chamber 12 and drive the make-up fan 115 of the condenser 65 that is secured to its outer end. The shafts 52, 53, 54, 55, 56 and 57 are journalled in the engine housing by bearings 60 and pack by glands 61. The shafts 53 and 54 of the steam motor rotor 27 and air motor rotor 25 are joined together by splines or other suitable means such that the rotors rotate together. The shafts 55 and 56 of the air-motor rotor 25 are joined together by splines or other suitable means such that the rotors rotate together.

Figure 2A:
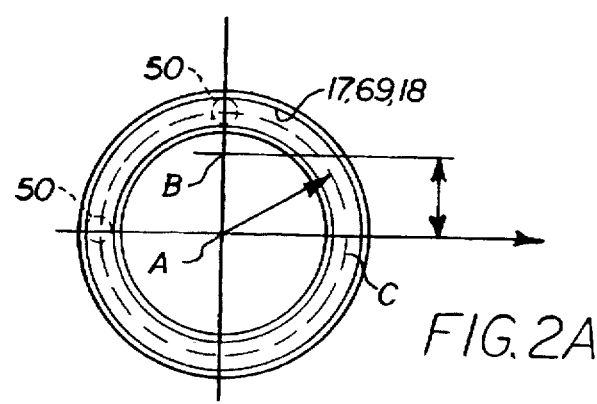
FIG. 2A is a partial elevation of the guide groove formed in the end walls of the air and steam motors and air-water compressor chambers of the sliding-blade refrigeration apparatus.

As shown in FIGS. 2, 2A, and 3, the centerline "B" of the shafts 52–57 and rotors 25, 27 and 26 is eccentrically offset a distance "L" from the center of the oval-shaped air-motor, steam motor and air-water compressor chambers 11, 62 and 12 respectively.

When the air motor, steam motor, air-water compressor rotors 25, 27 and 26 turn, the blades 43, 45, and 86, 87, and 44, 46 reciprocate radially resting on the rollers 39, 84 and 40 mounted in the walls 29, 28 and 30 of the cylindrical members 25A, 25B, and 27A, 27B, and 26A, 26B to form four vane blades of variable length in the respective operating chamber and function as pistons during the compression and expansion of the working medium. The radial travel of the blades 43, 86, 44 and 45, 87, 46 is regulated by the guide grooves 17, 69 and 18 in which the rollers 50 at the ends of the lugs 49 of each blade travel.

Referring now to FIG. 2, and 3, the centerline "B" of the shafts 52–57 and rotors 25, 27 and 26 is eccentrically offset from the center of the oval-shaped air motor, steam motor and air-water compressor chambers 11, 62 and 12 and the guide grooves 17, 69 and 18 by a distance L. The sliding-blades 43, 86, 44, and 45, 87, 46 of the air-motor rotor 25, steam motor rotor 27 and air-water compressor rotor 26 are of a predetermined length to provide a constant minimum clearance gap "G" between the outer tip ends of the blades and the interior surface of the oval side walls 13, 67 and 14 of the air-motor chamber 11, steam motor chamber 62 and air-water compressor chamber 12, respectively.

In a preferred embodiment, the centerline "C" of the guide grooves 17, 69 and 18 in the rotation plane of the air-motor, steam motor, and air-water compressor rotors 25, 27 and 26 is the circuit with the radius "r". This radius "r" must be greater than the eccentricity "L". The centerline "C" of the cylindrical guide grooves is defined by the equation: $x^2+y^2=r^2$; where x and y=the vertical and horizontal coordinates, r=the circuit radius, and L=eccentricity of the center of rotor rotation relative to the central axis of the chamber and guide grooves.

The inner surface of the oval side walls of the air-motor chamber 13, steam motor chamber 67 and air-water compressor 14 in the rotation plane of the rotors are calculated and configured according to the equation:

$$\frac{x^2}{h^2} + \frac{y^2}{(h+1/4L)^2 - L^2} = 1$$

Where
 x and y=coordinates,
 h=half of vane length=half of large oval axis,
 and
 L=eccentricity.

Figure 7:
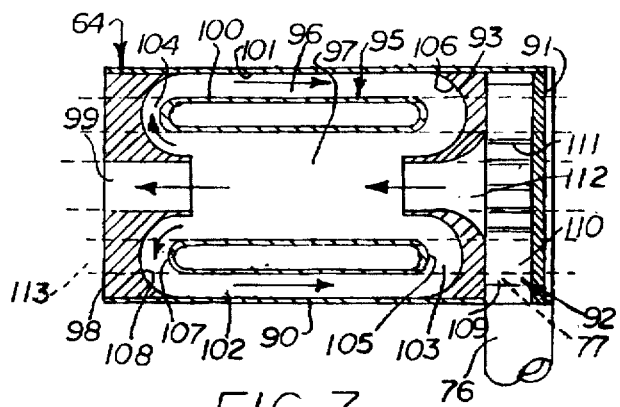
FIG. 7 is a schematic diagram of ejector with feedback.

Referring again to FIG. 1 and additionally to FIGS. 7–9, the vortex boiler 64 will be described. The vortex boiler 64 has a hollow cylindrical outer housing 90 enclosed at one end by an end plate 91. A first generally disk-shaped nozzle 93 is secured to the interior of the outer housing 90 a distance from one end and a second generally disk-shaped nozzle 98 is secured to the interior of the outer housing at the opposite end in longitudinally spaced relation. Each nozzle 93 and 98 has a circular peripheral side wall, a central conical extension, and a central bore 94 and 99, respectively, with a concave curved surface 105 and 108, respectively, extending between the peripheral side wall and the base of the conical extension. The conical extensions and concave curved surfaces 105 and 108 of the nozzles 93 and 98 are disposed in opposed inward facing relation. The nozzles 93 and 98 are provided with a series of circumferentially spaced apertures through which a series of heat tubes 113 (described below) extend.

An elongate hollow toroid 95 having an outer wall 100 and inner wall 114 and an elongate hooped interior cavity 96 is disposed in the interior of the outer housing 90 between the nozzles 93 and 98. The outer periphery 100 of the toroid 95 is smaller in diameter than the interior diameter 101 of the outer housing 90 to define an annular ring channel 102 therebetween. The rounded ends 105 and 107 of the toroid 95 are spaced a distance from the concave curved surfaces 106 and 108 of the nozzles 93 and 98 to define curvilinear channels 103 and 104 which are in communication with the annular ring channel 102 and the central bores of the nozzles. The annular ring channel 102 and the curvilinear channels 103 and 104 between the concave curved surfaces 106 and 108 defines an oblong looped recirculation channel. The looped recirculation channel in cooperation with the nozzles 93 and 98 form an ejector feedback loop. Although a single toroid and a pair of nozzles are shown defining the ejector feedback loop, it should be understood, that the vortex boiler 64 may contain several axially aligned sets of nozzles and toroids positioned back to back to form a series of ejector feedback loops.

The elongate hooped interior cavity 96 of the toroid 95 is connected in communication with a series of circumferentially spaced heat tubes 113 which extend outwardly from the toroid 95 and through each end of the outer housing 90. One end of the outer housing 90 is enclosed by an end plate 91 having circumferentially spaced apertures through which one end of the heat tubes 113 extend. The heat tubes 113 are connected at one end to a heat source and heat is conducted through the tubes 113 into the interior cavity 96 of the toroid 95 and is exhausted at the other end of the heat tubes. Heat may also be simultaneously delivered to the outer surface of the outer housing 90. The interior cavity 96 of the toroid 95 and heat tubes 113 serve as a heating jacket.

The interior of the vortex boiler outer housing 90 in cooperation with the nozzles 93 and 98 forms an upper vortex chamber 97. An inlet port 77 extends through the side wall of the outer housing 90 and is positioned to pass fluid tangentially into the outer housing.

Figure 8:
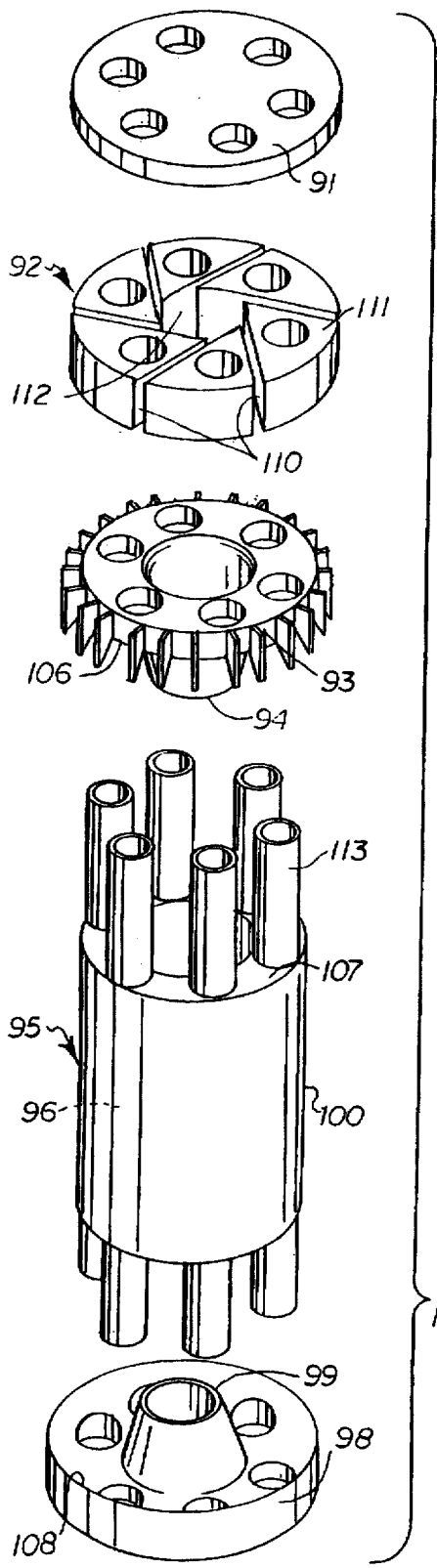
FIG. 8 is an isometric view of the part of the boiler heat transfer section of the sliding-blade refrigeration apparatus shown in an unassembled condition.

As best seen in FIGS. 8 and 9, a generally disk-shaped radial guide vane assembly 111 is secured in the outer housing 90 between the end plate 91 and the nozzle 93 and has a central bore 112 and circumferentially spaced apertures through which one end of the heat tubes 113 extend. The radial guide vane assembly 111 has a series of channels 110 which extend tangentially outward from the central bore 112 to the periphery of the guide vane assembly. The space between the outer periphery of the guide vane assembly 111 and the interior 101 of the outer housing 90 defines an annular ring distribution channel 109, and the central bore 112 serves as a lower vortex chamber 92.

As best seen in FIG. 1 water from the vortex separator 63 is conducted through conduit 76 and enters the inlet port 77 of the vortex boiler 64. As best seen in FIGS. 7, 8 and 9, water passing through the inlet port 77 enters ringed distribution channel 109 of the boiler 64 passes through the tangential channels 110 of the guide vane assembly 111 tangentially into the central bore 112 of the guide vane assembly (the lower vortex chamber 92), generating vortex flow of the water. The swirling vortex passes through the central bore of the nozzle 93 and enters the upper vortex chamber 97.

The swirling vortex entering the upper vortex chamber 97 is conducted along the inner wall 114 of the toroid 95 through the curvilinear channel 104 between the concave curved surface of nozzle 98 and the rounded end 107 of the toroid 95 and through the annular ring channel 102 between the outer periphery 100 of the toroid 95 and the interior 101 of the outer housing 90, generating a longitudinal vortex recirculating flow path (ejector feedback loop) around the toroid in channels 104, 102, and 103 and picks up heat from the toroid and heat tubes 113.

As a result of the Pito effect, "longitudinal" vortex circulation of the water is generated in the vortex chamber 97 around the toroid 95 such that feedback of the streams is achieved in forward and reverse directions. As a result, "transverse" vortex is added with the "longitudinal" vortex, which initiates intensive vortical structure of the streams. Due to the significant centrifugal force developed in the process, separation and stratification of the water takes place inside of this vortical stream.

Unvaporized water is brought into contact with the inner wall 114 of the toroid 95 and the interior surface 101 of the outer housing 90 (which may also be heated) by centrifugal force and passes through the annular ring channel 102 and returns to the lower end of the vortex chamber 97 to provide a high level of heat transfer.

Figure 10:
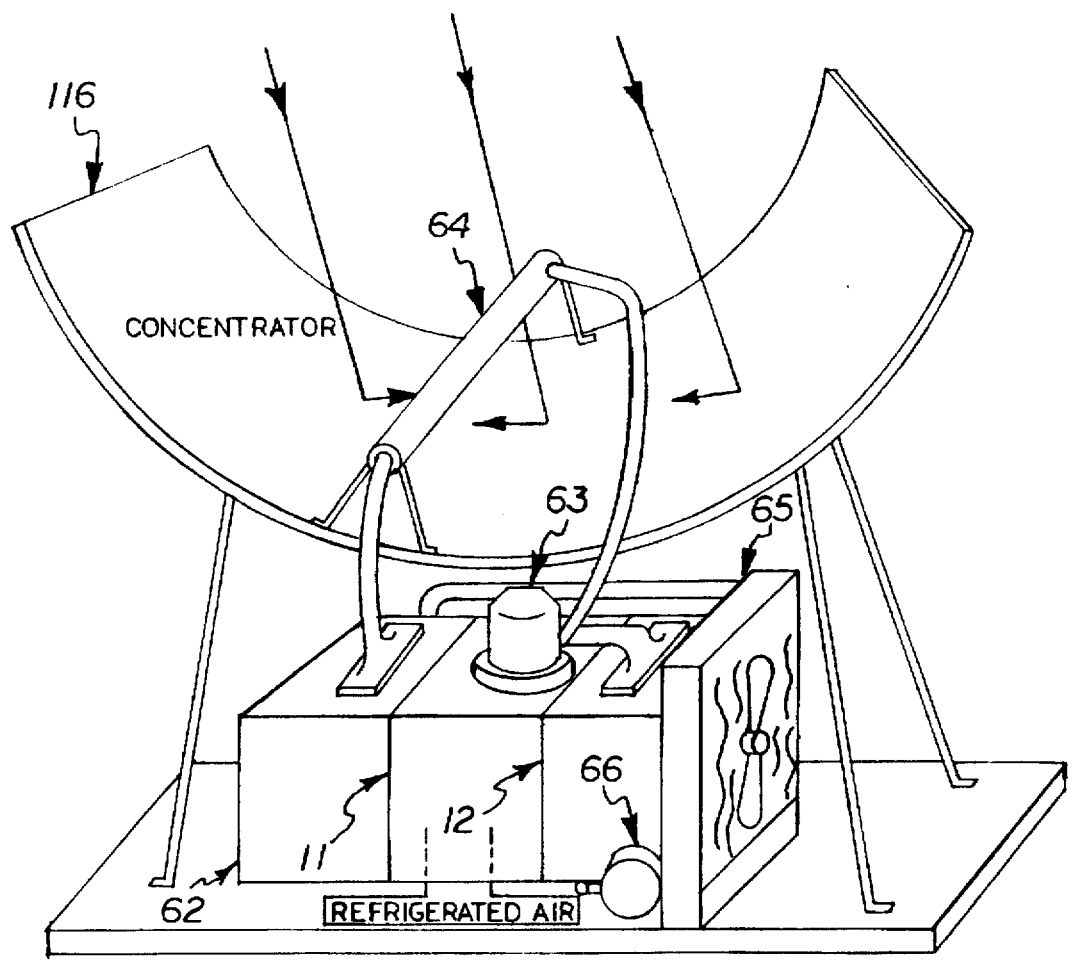
FIG. 10 is an exploded isometric view of the solar refrigeration trough system.

Waste heat can be used as a heat source for the present refrigeration apparatus, for example, exhaust heat from an engine may be conducted through the heat tubes and toroid. Solar energy may also be used to provide heat for the vortex boiler 64. FIG. 10 shows schematically a refrigeration system 10 in accordance with the present invention for home use wherein the vortex boiler 64 is mounted in the focus point of a solar concentrator 116.

Figure 11:
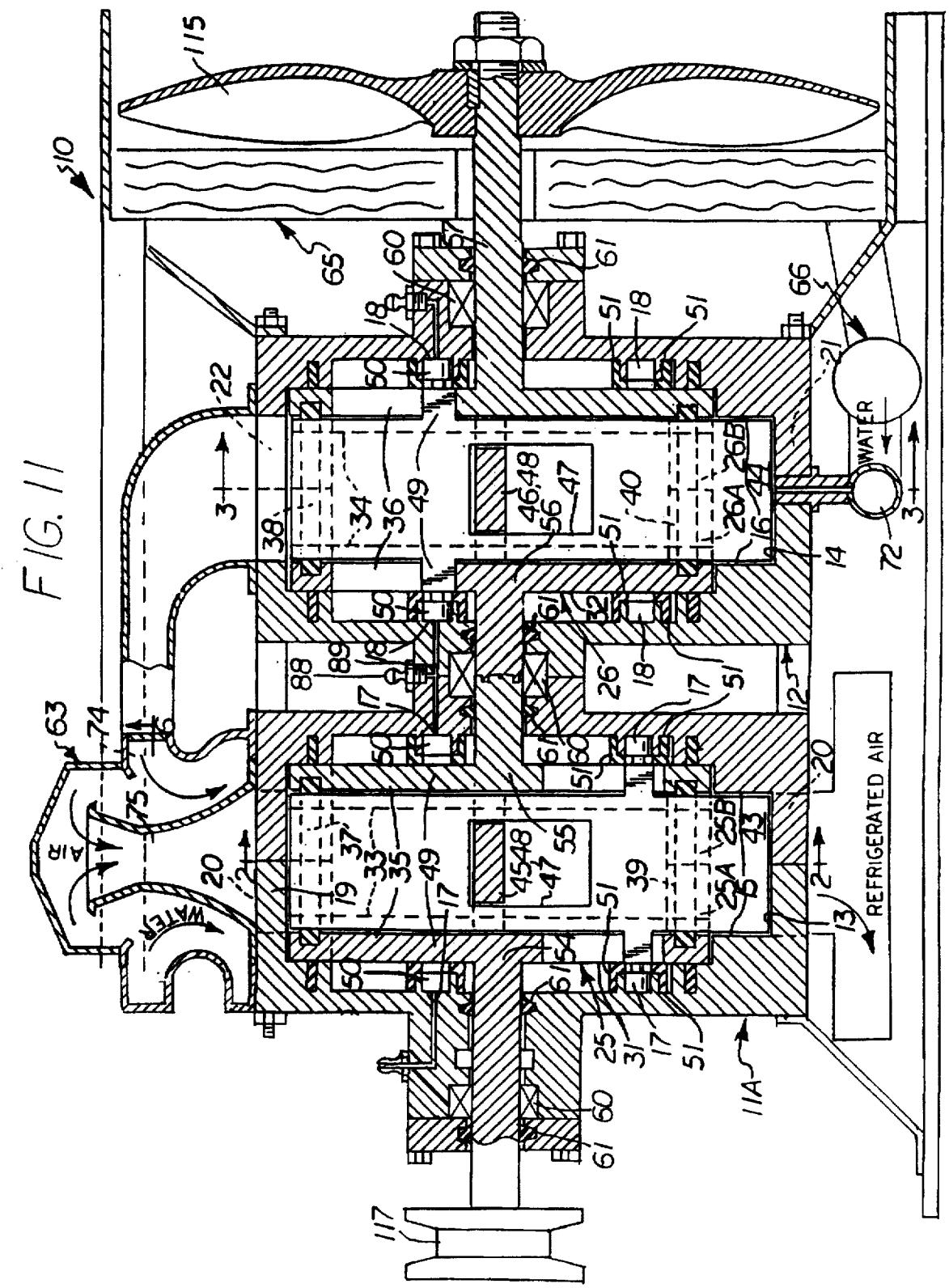
FIG. 11 is a vertical cross section of the sliding-blade refrigeration apparatus without the steam motor.

Referring now to FIG. 11 of the drawings, there is shown a modification of the sliding-blade refrigeration apparatus 10A without the boiler and the steam-motor which operates by external drive.

In the following description, only the components which are modified are described in detail. The rotors, operating chambers and other components of the air motor and air-water compressor which are not modified are the same as previously described are given the same reference numerals. However, the detailed description of the unmodified components will not be repeated to avoid repetition. The refrigeration system 10A has an oval-shaped air motor operating chamber 11A and an adjacent air-water compressor chamber 12A, and the steam motor 62 and boiler 64 are eliminated. In this modification of the refrigeration system, water enters directly into the condenser 65 from the separator 63, and one of the shafts 54A extends outwardly from its center through a hole in the flat end wall 15A of the chamber 11A and a drive pulley 117 is secured to its outer end. The drive pulley 117 is rotated by a power source, such as a electrical motor and belt drive (not shown) exterior of the chamber 11A which rotates the rotors 25 and 26.

OPERATION

To start the external drive embodiment of FIG. 11 (without the boiler and the steam motor) an appropriate amount of water is introduced into the system and the rotors are rotated by the external drive.

In the embodiment without the external drive one should shut off channel 76 using throttle 78, introduce an appropriate amount of water into the vortex boiler 64 and input heat to the vortex boiler.

Figure 12:
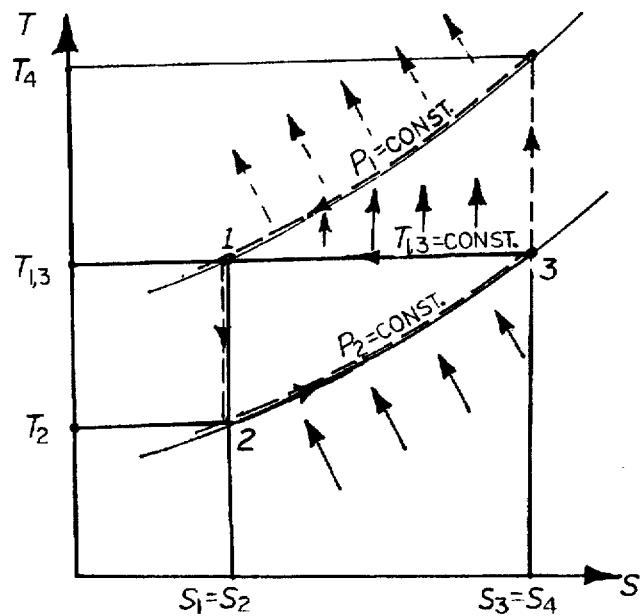
FIG. 12 is a diagram illustrating the thermodynamic cycle of the present invention.

The air-compression refrigeration cycles are shown on a T-s (temperature-entropy) diagram in FIG. 12. In the diagram, lines 3 and 4 represent adiabatic compression of air in the compressor and lines 1 and 2 represent adiabatic expansion of air in the expander, the lines extending between points 3 and 1 illustrate the process of isothermal compression of the air-water mixture in the air-water compressor 12 and the line extending between points 1 and 2 represent adiabatic expansion of separated air performing useful work in the air-motor 11. It follows that the work spent in the air-compression cycle of a conventional refrigeration system is depicted by the generally rectangular area 1-2-3-4-1. The work spent by the present apparatus and method is depicted by the generally triangular area 1-2-3-1 and, as can be seen, is considerably less than the area 1-2-3-4-1.

Referring again to FIGS. 2 and 3 and the thermodynamic diagram of FIG. 12, as the air-water compressor rotor 26 turns, a large volume of ambient air is drawn in through the plurality of air intake ports 21 of the air-water compressor chamber 12 (point 3 in FIG. 12). Simultaneously fine dispersed cold water is injected through the plurality of water atomizers 73 into the air-water compressor chamber during the continuous compressing process and mixed with air. As the air-water mixture travels around the diminishing volume of the oval-shaped air-water compressor chamber 12, the air-water mixture is compressed isothermally (line 3 to 1 in FIG. 12) and discharged through the exhaust port 22 and valve 24 into the vortex separator 63 (point 1 in FIG. 12). The quantity of injected cold water and its temperature is sufficient for extracting heat, thereby minimizing adiabatic heating of the air and providing the isothermal compressing of the air-water mixture.

In the vortex separator 63, air and water are divided or stratified by centrifugal force. Separated water enters the vortex chamber 92 of the vortex boiler 64. A swirled inlet stream of water from nozzle 93 enters into the near-axis upper vortex chamber 97 surrounded by toroid 95 in the form of a "transverse" vortex flow, which on flowing past the toroid in the recirculating channel 104, 102, 103, is supplemented with a recirculating "longitudinal" vortex flow and initiates an intensive vortical structure of the streams. Due to the action of centrifugal force, water in the process of its vaporization separates from the saturated steam and makes immediate contact with the heat transferring surfaces 101 and 114 of the boiler 64. In the process of superheating the steam, saturated steam being more cool and heavy relative to superheated steam, is also in immediate contact with the heat transferring surfaces. This process secures a higher level of heat transfer and augments the Nusselt number many-fold. This leads to considerable decrease in heat exchanger overall size for a given heat output.

Superheated steam from the boiler 64 enters the steam motor operating chamber 62 and expands to perform useful work which causes rotation of the air-water compressor rotor 26. Spent steam enters the condenser 65 and is condensed and cooled. Cooled water is delivered by the pump 66 into the channel 72, and dispersed through the water atomizers 73 in fine-dispersed form and becomes added to the air being compressed in the air-water compressor 12.

The separated isothermally compressed air (point 1 in FIG. 12) from the vortex separator 63 enters the air-motor operating chamber 11 via central channel 75, expands to perform useful work and also rotates the rotor of the air-water compressor 26, and in the cooled condition is available to the user (point 2 in FIG. 12). The throttle 78 located in the water channel 76 allows additional control of water and air distribution in the respective channels (FIG. 1).

Figure 13:
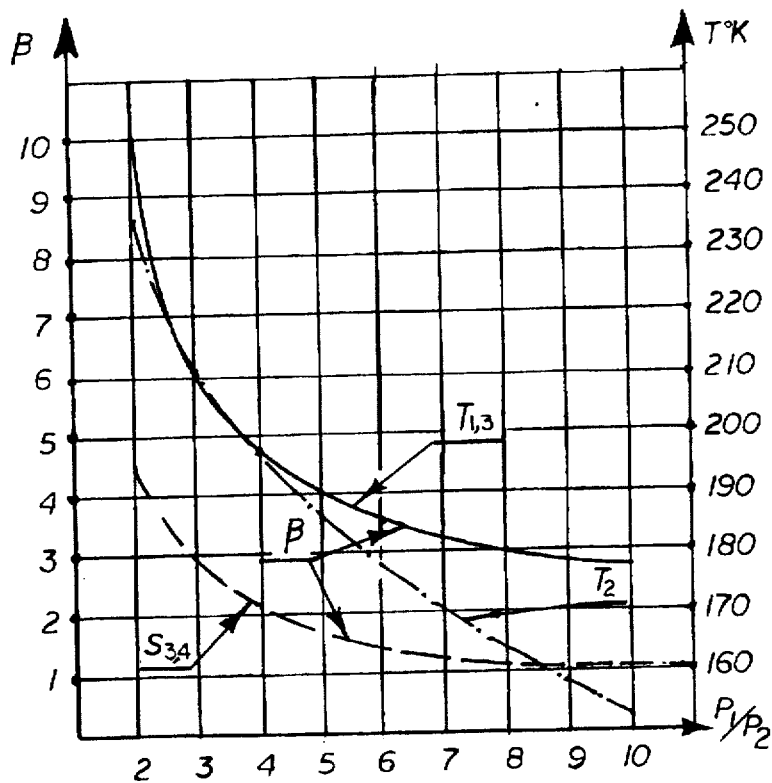
FIG. 13 is a plot of the dependence of the theoretical coefficient of performance $\beta$ and temperature of cooled air on pressure ratio $P_1/P_2$.

FIG. 13 is a graph showing the dependence of the theoretical coefficient of performance β and temperature of the cooled air $T_2$ (point 2 in FIG. 12) on the pressure ratio $P_1/P_2$. The uppermost line $T_{1,3}$ represents the constant of isothermal compression of the air-water mixture. Line $S_{3,4}$ represents the constant of adiabatic compression of air. The dependence of the theoretical coefficient of performance β on the pressure ratio $P_1/P_2$ is calculated according to the following equation:

$$\beta = \frac{1 - \left(\frac{P_1}{P_2}\right)^{\frac{K-1}{K}}}{\frac{K-1}{K} \ln \frac{P_1}{P_2} + \left(\frac{P_1}{P_2}\right)^{\frac{K-1}{K}} - 1}$$

Where
$K$ = adiabatic exponent,
$P_2$ = pressure of ambient air, and
$P_1$ = pressure of compressed air.

While this invention has been described fully and completely with special emphasis upon preferred embodiments, it should be understood that within the scope of the appended claims the invention may be practiced otherwise than as specifically described herein.

We claim:

1. A refrigeration method utilizing a rotary sliding-blade refrigeration apparatus and an ambient air and water mixture as the refrigerant medium comprising the steps of:

providing a rotary sliding-blade air-water compressor and a rotary sliding-blade air motor, each having oval-shaped operating chambers with a cylindrical rotor rotatably mounted eccentrically therein, each rotor having at least two rectangular blades slidably mounted in slots extending through the respective cylindrical rotor in mutually perpendicular relation and each blade independently movable relative to the other in a radial direction, said rotors connected together by shafts in concentric relation whereby rotation of said air motor rotor causes simultaneous rotation of said air-water compressor rotor;

said rotary air-water compressor having an ambient air intake, a water atomizer injector, and an air-water mixture discharge port connected with an inlet of an air-water separator;

said rotary air motor having a compressed air inlet connected with with an air outlet of said air-water separator, and a cool air discharge port;

isothermally compressing an ambient air and water mixture in said rotary sliding-blade air-water compressor to form an isothermally compressed air and water mixture;

separating air and water from said isothermally compressed air and water mixture;

introducing a portion of said separated air into said rotary sliding-blade air motor; and adiabatically expanding said separated compressed air in said rotary sliding-blade air motor to drive said rotary sliding-blade air-water compressor and thereby extract heat from said adiabically expanded air to produce cool refrigerated air therefrom.

2. A refrigeration method utilizing an ambient air and water mixture as the refrigerant medium comprising the steps of:

isothermally compressing an ambient air and water mixture in a rotary air-water compressor to form an isothermally compressed air and water mixture;

separating air and water from said isothermally compressed air and water mixture;

introducing a portion of said separated air into a rotary air motor;

adiabatically expanding said separated compressed air in said air motor to drive said air-water compressor and thereby extract heat from said adiabically expanded air to produce cool refrigerated air therefrom;

boiling water separated from said isothermaly compressed air and water mixture to produce steam;

utilizing a portion of said produced steam to drive a steam motor to produce useful work;

condensing waste steam from said steam motor to form cool water; and atomizing a portion of said cool water and mixing said atomized cool water with said ambient air and water mixture to facilitate the step of isothermal compression.

3. The refrigeration method according to claim 2 including the steps of:

utilizing a portion of said produced steam to drive a steam motor operatively connected with said rotary air-water compressor to perform useful work and to drive said air-water compressor.

4. The refrigeration method according to claim 2 wherein said step of separating water from said isothermally compressed air and water mixture is accomplished by vortex separation.

5. A refrigeration apparatus utilizing an ambient air and water mixture as the refrigerant medium comprising:

a rotary air-water compressor having an ambient air intake, a water atomizer injector, and an air-water mixture discharge port;

a vortex air-water separator having an inlet connected with said compressor air-water mixture discharge port, a return water outlet, and an air outlet;

a water condenser having an inlet connected with said separator return water outlet, and an outlet connected with said compressor water atomizer injector;

a rotary air motor operatively connected with said rotary air-water compressor for rotating said compressor and having a compressed air inlet connected with said air-water separator and a cool air discharge port; wherein ambient air is drawn into said air-water compressor upon rotation thereof and atomized water is introduced into said compressor to form an ambient air-water mixture therein and upon continued rotation said ambient air-water mixture is isothermally compressed and the compressed air-water mixture is discharged into said vortex air-water separator where water is separated from said isothermally compressed air and water mixture and returned to said water condenser and a portion of compressed air separated from said mixture is discharged into said rotary air motor and adiabatically expanded therein to drive said air motor and drive said air-water compressor and extract heat from said adiabatically expanded air, and said adiabatically expanded air is discharged as cool refrigerated air;

said rotary air motor and said rotary air-water compressor each having an oval-shaped operating chamber with a peripheral side wall which is oval-shaped in cross section, parallel opposed facing flat end walls, and a continuous cylindrical-shaped guide groove concentric with said peripheral side wall formed in each said end wall;

a cylindrical rotor having a circular side wall, parallel opposed flat end walls, a concentric shaft extending outwardly from each said end wall, and at least two mutually perpendicular slots extending radially through said rotor with a radial extending portion of each said slot extending through said end walls, said rotor rotatably mounted by said shafts eccentrically in said operating chambers relative to the major axis of said operating chambers;

at least two elongate rectangular rotor blades one slidably mounted in each of said slots extending through said rotor in mutually perpendicular relation and each independently movable relative to the other in a radial direction, each said rotor blade having a guide element extending from opposed sides and through said radial extending portion of each said slot outwardly from said rotor end walls and slidably received in said cylindrical-shaped guide groove in said operating chamber end walls;

said air motor and said air-water compressor rotor connected together by said shafts in concentric relation whereby rotation of said air motor rotor causes simultaneous rotation of said air-water compressor rotor, and upon rotation of said air motor rotor and said air-water compressor rotor said guide elements traveling in said cylindrical-shaped guide grooves causing said rotor blades to extend and retract radially with their outer ends following the inner periphery of the respective oval-shaped side walls of said operating chambers with a constant minimum clearance between the outer tip ends of said blades and said inner peripheries;

said rotary air motor compressed air inlet and said cool air discharge port each formed in said rotary air motor operating chamber side wall and configured to receive said compressed air and discharge said cool air, respectively, tangential to the axis of rotation of said rotor, said compressed air expanding adiabatically in said operating chamber to impart a force on said blades to cause rotation of said rotor thereby extracting heat from said adiabatically expanding air and discharge said adiabatically expanded air as cool refrigerated air; and said rotary air-water compressor ambient air intake and said air-water mixture discharge port are each formed in said air-water compressor operating chamber side wall and configured to draw ambient air into said compressor operating chamber and discharge said air-water mixture tangential to the axis of rotation of said rotor upon rotation thereof, and as rotation continues said compressor blades pressurizing the air-water mixture in said compressor operating chamber and discharging the pressurized air-water mixture through said air-water mixture discharge port to said vortex separator.

6. The refrigeration apparatus according to claim 5 wherein said rotary air motor and said rotary air-water compressor each has an operating chamber, a rotor rotatably mounted in each respective said operating chamber on shafts;

said air motor rotor and said air-water compressor rotor are connected together by said shafts in concentric relation whereby rotation of said air motor rotor causes simultaneous rotation of said air-water compressor rotor;

said air motor rotor having a shaft extending outwardly from the interior of said air motor operating chamber; and drive means on the outer end of said outwardly extending shaft for rotating said air motor rotor, and said air-water compressor rotor connected thereto.

7. The refrigeration apparatus according to claim 5 further comprising:

pump means having a water inlet connected with said condenser outlet, and a water discharge end;

a water channel conduit exterior of said air-water compressor operating chamber having a water inlet at one end connected to said pump means discharge end; and a plurality of water atomizer injectors disposed between said water channel conduit and said air-water compressor, each having an interior in fluid communication with the interior of said water channel conduit and said air-water compressor operating chamber.

8. The refrigeration apparatus according to claim 5 further comprising:

a vortex boiler and a rotary steam motor connected between said vortex air-water separator and said water condenser;

said vortex boiler connected with a heat source for boiling water to produce steam and having a water inlet connected with said vortex air-water separator return water outlet and a steam outlet;

said rotary steam motor having a steam inlet connected with said boiler steam outlet and a spent steam outlet connected with said water condenser inlet; wherein ambient air is drawn into said air-water compressor upon rotation thereof and atomized water is introduced into said compressor to form an ambient air-water mixture therein and upon continued rotation said ambient air-water mixture is isothermally compressed and the compressed air-water mixture is discharged into said vortex air-water separator where water is separated from said isothermally compressed air and water mixture and introduced into said boiler and heated to produce steam which is discharged into said rotary steam motor to perform useful work and the spent steam is discharged to said water condenser and a portion of compressed air separated from said mixture is discharged into said rotary air motor and adiabatically expanded therein to drive said air motor and drive said air-water compressor and extract heat from said adiabatically expanded air, and said adiabatically expanded air is discharged as cool refrigerated air.

9. The refrigeration apparatus according to claim 8 wherein said rotary steam motor is operatively connected with said rotary air-water compressor for rotating said air-water compressor upon rotation of said rotary steam motor.

10. The refrigeration apparatus according to claim 9 wherein said rotary air motor, said rotary air-water compressor, and said steam motor each has an oval-shaped operating chamber with a peripheral side wall which is oval-shaped in cross section, parallel opposed facing flat end walls, and a continuous cylindrical-shaped guide groove concentric with said peripheral side wall formed in each said end wall;

a cylindrical rotor having a circular side wall, parallel opposed flat end walls, a concentric shaft extending outwardly from each said end wall, and at least two mutually perpendicular slots extending radially through said rotor with a radial extending portion of each said slot extending through said end walls, said rotor rotatably mounted by said shafts eccentrically in said operating chambers relative to the major axis of said operating chambers;

at least two elongate rectangular rotor blades one slidably mounted in each of said slots extending through said rotor in mutually perpendicular relation and each independently movable relative to the other in a radial direction, each said rotor blade having a guide element extending from opposed sides and through said radial extending portion of each said slot outwardly from said rotor end walls and slidably received in said cylindrical-shaped guide groove in said operating chamber end walls;

said air motor, said air-water compressor rotor, and said steam motor rotor are connected together by said shafts in concentric relation whereby rotation of said air motor rotor and said steam motor rotor causes simultaneous rotation of said air-water compressor rotor, and upon rotation of said air motor rotor, said air-water compressor rotor, and said steam rotor, said guide elements traveling in said cylindrical-shaped guide grooves causing said rotor blades to extend and retract radially with their outer ends following the inner periphery of the respective oval-shaped side walls of said operating chambers with a constant minimum clearance between the outer tip ends of said blades and said inner peripheries;

said rotary air motor compressed air inlet and said cool air discharge port are each formed in said rotary air motor operating chamber side wall and configured to receive said compressed air and discharge said cool air, respectively, tangential to the axis of rotation of said rotor, said compressed air expanding adiabatically in said operating chamber to impart a force on said blades to cause rotation of said rotor thereby extracting heat from said adiabatically expanding air and discharge said adiabatically expanded air as cool refrigerated air;

said rotary steam motor steam inlet and said spent steam outlet are each formed in said rotary steam motor operating chamber side wall and configured to receive said steam and discharge said spent steam, respectively, tangential to the axis of rotation of said rotor, said steam expanding in said operating chamber to impart a force on said blades to cause rotation of said rotor and discharge said spent steam through said spent steam outlet to said water condenser; and said rotary air-water compressor ambient air intake and said air-water mixture discharge port are each formed in said air-water compressor operating chamber side wall and configured to draw ambient air into said compressor operating chamber and discharge said air-water mixture tangential to the axis of rotation of said rotor upon rotation thereof, and as rotation continues said compressor blades pressurizing the air-water mixture in said compressor operating chamber and discharging the pressurized air-water mixture through said air-water mixture discharge port to said vortex separator.

11. The refrigeration apparatus according to claim 10 wherein:

said vortex boiler has vortex means adjacent said water inlet for causing received water to form a swirling vortex, and at least one elongate curvilinear looped fluid recirculation channel in said boiler configured to generate longitudinal and transverse vortex flow of a portion of said received water and to recirculate said portion back into said swirling vortex;

said vortex boiler connected with a source of heat of sufficient temperature to vaporize said water and discharge it as steam to be expanded in said rotary steam motor operating chamber.

12. The refrigeration apparatus according to claim 10 wherein said cylindrical guide grooves in said operating chamber end walls have a centerline in the plane in the plane of rotation defined by the equation:

$$x^2 + y^2 = r^2$$

where x and y represent the vertical and horizontal coordinates, r represents the circuit radius and is greater than the eccentrically offset distance between the center of rotor rotation relative to the central axis of said operating chamber and said guide grooves.

13. The refrigeration apparatus according to claim 10 wherein said inner periphery of said oval-shaped side walls of said air-motor, said steam motor, and said air-water compressor operating chambers in the plane of rotor rotation is configured according to the equation:

$$\frac{X^2}{h^2} + \frac{y^2}{(h+1/4L)^2 - L^2} = 1$$

where x and y represent vertical and horizontal coordinates of said operating chambers, h is equal to one-half of the length of said rotor blades and equal to one-half of the major axis of said oval-shaped inner periphery, and L is equal to the eccentrically offset distance between the center of said oval-shaped operating chambers and said guide grooves.

14. The refrigeration apparatus according to claim 10 further comprising roller means on each said rotor disposed adjacent said radially extending slots and engaged with said rotor blades to support and facilitate extension and retraction thereof.

15. The refrigeration apparatus according to claim 10 further comprising guide roller means at the outer of said rotor blade guide elements rotatably engaged in said cylindrical-shaped guide grooves in said operating chamber end walls.

16. The refrigeration apparatus according to claim 15 further comprising lubrication means connected with said guide grooves in said operating chamber side walls to provide lubrication to said guide roller means, and lubricant seal means surrounding each said guide groove disposed between the inner surface of each said operating chamber end wall and the outer surfaces of each said rotor end wall to form a lubricant sealing relation therebetween.

17. The refrigeration apparatus according to claim 10 wherein said rotary air motor compressed air inlet and said cool air discharge port are each substantially the same width as the width of said rotary air motor operating chamber;

said rotary steam motor steam inlet and said spent steam outlet are each substantially the same width as the width of said rotary steam motor operating chamber; and said rotary air-water compressor ambient air intake and said air-water mixture discharge port are each substantially the same width as the width of said rotary air-water compressor operating chamber.

18. The refrigeration apparatus according to claim 10 further comprising:

valve means connected with said rotary air-water compressor ambient air intake to allow said ambient air to flow only into said air-water compressor operating chamber; and valve means connected with said air-water compressor chamber air water mixture discharge port to allow said air-water mixture to flow only out of said air-water compressor operating chamber.

\* \* \* \* \*